United States Patent [19]

Ideta et al.

[11] Patent Number: 4,628,754
[45] Date of Patent: Dec. 16, 1986

[54] OUTPUT GEAR OF AUTOMATIC TRANSMISSION

[75] Inventors: Yasufumi Ideta, Sagamihara; Shigeru Miida, Atsugi, both of Japan

[73] Assignee: Nissan Motor Company, Limited, Yokohama, Japan

[21] Appl. No.: 660,081

[22] Filed: Oct. 12, 1984

[30] Foreign Application Priority Data

Oct. 14, 1983 [JP] Japan ................. 58-190677

[51] Int. Cl.⁴ ............ F16H 57/04; F16H 57/02; F01M 9/00
[52] U.S. Cl. .................. 74/467; 74/606 R; 184/6.12
[58] Field of Search ............ 74/467, 606 R; 184/6.12

[56] References Cited

U.S. PATENT DOCUMENTS

| | | | |
|---|---|---|---|
| 2,984,122 | 5/1961 | Woolley | 184/6.12 |
| 3,035,457 | 5/1962 | Cartwright | 74/730 |
| 3,097,546 | 7/1963 | Kelbel et al. | 184/6.12 |
| 3,099,927 | 8/1963 | Anderson | 74/496 |
| 3,614,902 | 10/1971 | Candellero | 74/695 |
| 3,859,872 | 1/1975 | Clauss | 74/763 |
| 4,095,487 | 6/1978 | Cartwright et al. | 74/695 |
| 4,222,283 | 9/1980 | Nagy | 74/467 |
| 4,232,567 | 11/1980 | Hobbs | 74/677 |
| 4,283,968 | 8/1981 | Kalns | 74/701 |
| 4,531,421 | 7/1985 | Vieth | 74/467 |

FOREIGN PATENT DOCUMENTS

| | | |
|---|---|---|
| 2401542 | 7/1975 | Fed. Rep. of Germany ........ 74/467 |
| 2430543 | 2/1980 | France . |
| 54-132062 | 10/1979 | Japan . |
| 55-40367 | 3/1980 | Japan . |
| 1518092 | 7/1978 | United Kingdom . |

Primary Examiner—Kenneth J. Dorner
Assistant Examiner—Mike Bednarek
Attorney, Agent, or Firm—Schwartz, Jeffery, Schwaab, Mack, Blumenthal & Evans

[57] ABSTRACT

A hub of an output gear is connected detachably to a rear end of a main power train for an automatic transmission of a front engine rear wheel drive vehicle by means of splines, so that the main power train can be used as a power train of an automatic transmission for a front engine front wheel drive vehicle. The hub of the output gear has an annular groove for receiving a lubricating oil. The annular groove is enlarged in both width and depth so that most of the oil in the annular groove does not rotate together with the output gear and does not hamper the lubricating oil supply through the annular groove.

10 Claims, 4 Drawing Figures

OUTPUT GEAR OF AUTOMATIC TRANSMISSION

BACKGROUND OF THE INVENTION

The present invention relates to an output gear of an automatic transmission for a front engine front wheel drive vehicle, whose main power train is so designed that it can be used also as a main power train of an automatic transmission for a front engine rear wheel drive vehicle.

Japanese Patent provisional publication No. 55-40367 discloses one example of an automatic transmission for a front engine front wheel drive vehicle. The power train of this automatic transmission differs from that of an automatic transmission for a front engine rear wheel drive vehicle (as disclosed in Japanese Patent provisional publication No. 54-132062, for example). Therefore, power trains of two different kinds must be fabricated separately.

SUMMARY OF THE INVENTION

It is an object of the present invention to provide an automatic transmission for a front engine front wheel drive vehicle, which is so designed that a power train for an automatic transmission of a front engine rear wheel drive vehicle can be used, and the supply of lubricating oil is not hampered by centrifugal force even during a high speed operation.

According to the present invention, an automatic transmission comprises a main power train comprising a rotatory terminal member, housing means enclosing the main power train, and an output gear. The housing means has a cylindrical bore and at least one oil feed passage opening in a cylindrical surface of the bore. The output gear is rotatably supported by the housing means. The output gear has a hub which is connected detachably with the terminal member, and which is fitted in the bore of the housing means in such a manner that the hub can rotate in the bore. The hub has an annular groove formed on an outer cylindrical surface of the hub. The output gear is formed with lubricating means extending from the annular groove for conveying oil from the annular groove. The oil passage of the housing means opens into the annular groove for supplying oil into the lubricating means through the annular groove. The annular groove has sufficient depth and width within a range permitted by a strength of the hub to prevent a shortage of the oil supply through the annular groove to the lubricating means due to a centrifugal force of the oil rotating in the annular groove together with the walls of the annular groove.

DETAILED DESCRIPTION OF THE INVENTION

Figure 1:
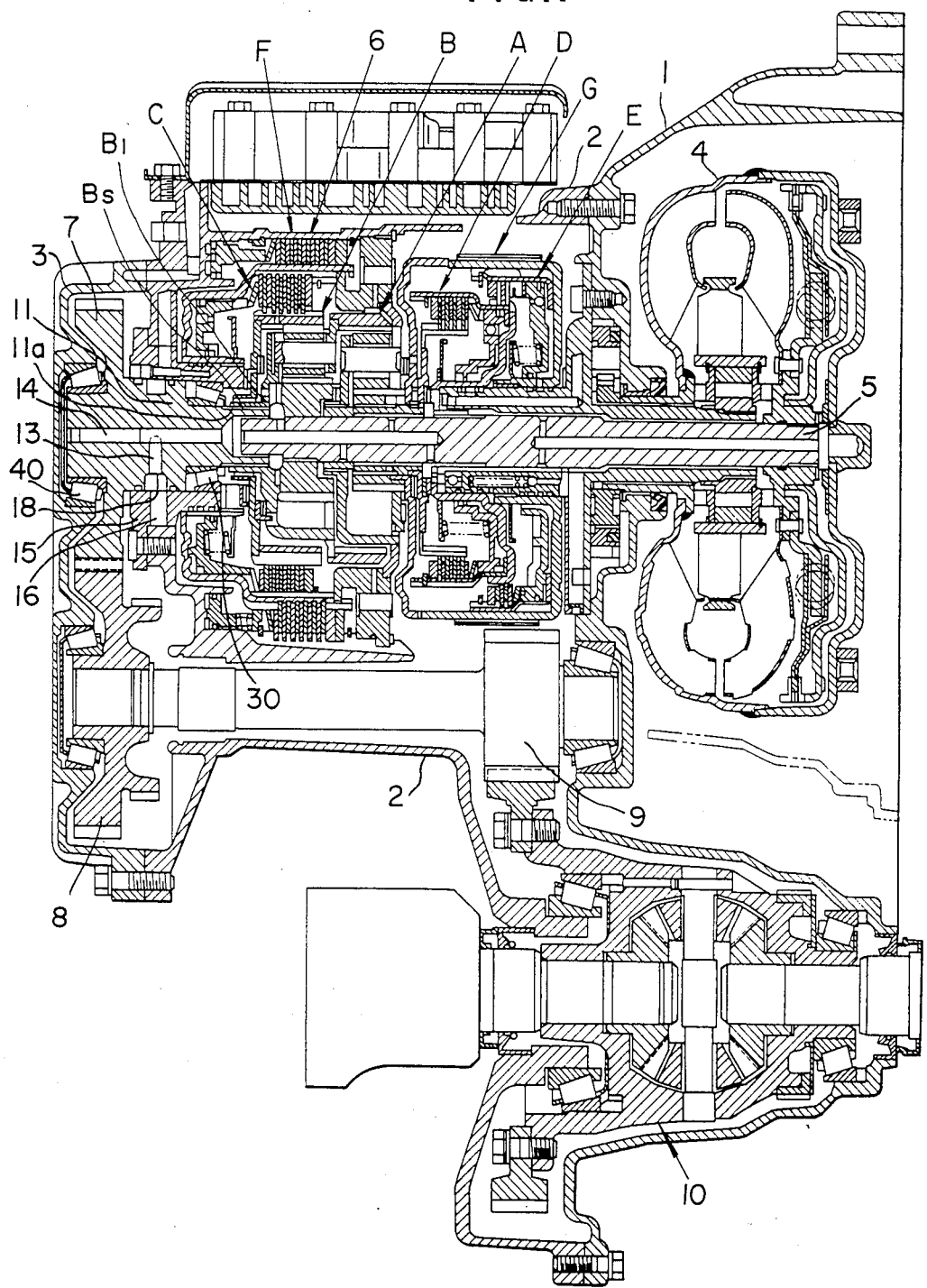
FIG. 1 is a sectional view of an automatic transmission for a front engine front wheel drive vehicle according to the present invention.

FIG. 1 shows an automatic transmission for a front engine front wheel drive motor vehicle according to the present invention. This transmission comprises a torque converter case 1, a transmission case 2, a side cover 3, a torque converter 4, an input shaft 5, a main power or gear train 6 disposed around the input shaft 5 in the transmission case 2, and an output gear 7. The transmission is combined with a differential 10 through a counterdriven gear 8 and an idler gear 9 so that they form a single unit. The members 4 to 10 constitute a FF vehicular power train.

The main power train 6 is so designed in order to reduce the manufacturing cost that it can be used also as a main power train of an automatic transmission for a front engine rear wheel drive vehicle. This main power train 6 usable for either a front engine front wheel drive vehicle or a front engine rear wheel drive vehicle comprises a first planetary gear set A, a second planetary gear set B, a first clutch C, a second clutch D, a third clutch E, a first brake F, and a second brake G. A pinion gear carrier $B_1$ of the second planetary gear set B has internal splines $B_s$ formed on an inner surface of a cylindrical bore of the carrier $B_1$.

When the main power train 6 is used in a trasmission for a front engine rear wheel drive vehicle, splines $B_s$ of the carrier $B_1$ are engaged with a splined shaft which is fitted in the bore of the carrier $B_1$ and connected to a propeller shaft.

When the main power train 6 is used in a transmission for a front engine front wheel drive vehicle, the internally splined bore of the carrier $B_1$ is fitted over an externally splined hub 11 of an output gear 7, as shown in FIG. 1. The hub 11 of the output gear 7 has external splines 11a formed on an outer cylindrical surface of an end portion of the hub 11. The hub 11 of the output gear 7 is fitted in a bore of a bearing retainer 15 fixed to the transmission case 2 by bolts. The hub 11 of the output gear 7 is rotatable in the bore of the bearing retainer 15. The output gear 7 is rotatably supported by the transmission case 2 through bearings 30 and by the side cover 3 through bearings 40. The output gear 7 is connected to the counterdriven gear 8, the idler gear 9 and the differential 10 which are usable only for a front engine front wheel drive vehicle.

Figure 2:
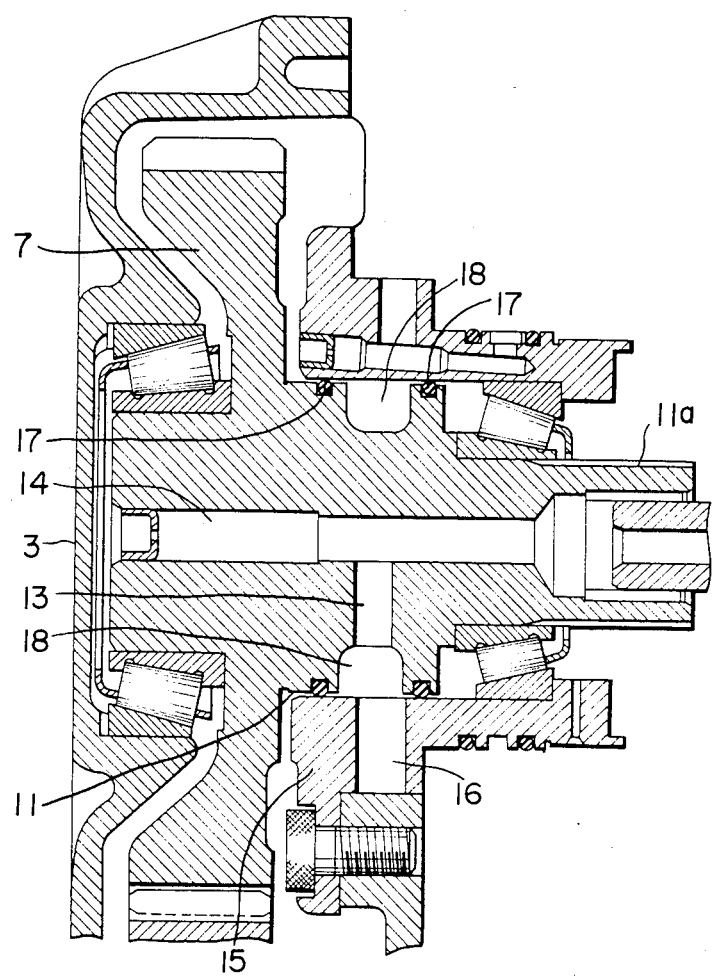
FIG. 2 is an enlarged sectional view of a portion around an output gear shown in FIG. 1.

As shown in FIG. 2, the hub 11 of the output gear 7 has an annular oil groove 18 formed in the outer periphery of a cylindrical base portion of the hub 11. The hub 11 further has at least one radial oil passage 13 extending radially from the bottom of the annular groove 18 toward the axis of the output gear 7. In this example, there are three radial oil passages 13. The output gear 7 has an axially extending central oil passage 14. The bearing retainer 15 has at least one oil passage 16 which extends radially toward the axis of the output gear 7 and opens into the annular groove 18 of the output gear 7. Two oil seals 17 are disposed between the hub 11 of the output gear 7 and the bearing retainer 15. The annular groove 18 is located between the two oil seals 17.

The annular oil groove 18 is enlarged in both depth and width sufficiently to prevent a shortage of the oil supply from the oil passage 16 to the oil passages 13 through the annular groove 18 within such a range that the strength of the hub of the output gear 7 is not decreased below an allowable limit.

It has been confirmed experimentally that a dimension of about 10 mm is desirable for both of the width and depth of the annular oil groove 18. In this embodiment, the outer diameter of the cylindrical base portion is 53 mm, and the annular groove 18 is 9 mm in depth and 11 mm in width. The diameter of the cylindrical bottom of the annular groove 18 is 35 mm. The depth of the annular groove 18 is slightly smaller than the width so that the annular groove 18 and the three radial passages 13 should not weaken the hub 11 too much. The width of the annular groove 18 is a distance between two side walls of the annular groove 18 which are spaced axially of the output gear 7, and substantially flat and parallel to each other. If the diameter of the hub 11 is greater than that of this example, the width and depth of the annular groove 18 can be made greater than about 10 mm.

According to the present invention, the splines 11a formed in the hub 11 of the output gear 7 are engaged with the splines $B_s$ of the pinion gear carrier $B_1$ which is an output terminal member of the main power train 6, the hub 11 is fitted in the bore of the bearing retainer 15 fixed to the transmission case 2, and the output gear 7 is rotatably supported through the bearings 30 and 40. Accordingly, the main power train 6 for a front engine rear wheel drive vehicle can be used for a transmission for a front engine front wheel drive vehicle.

Figure 3:
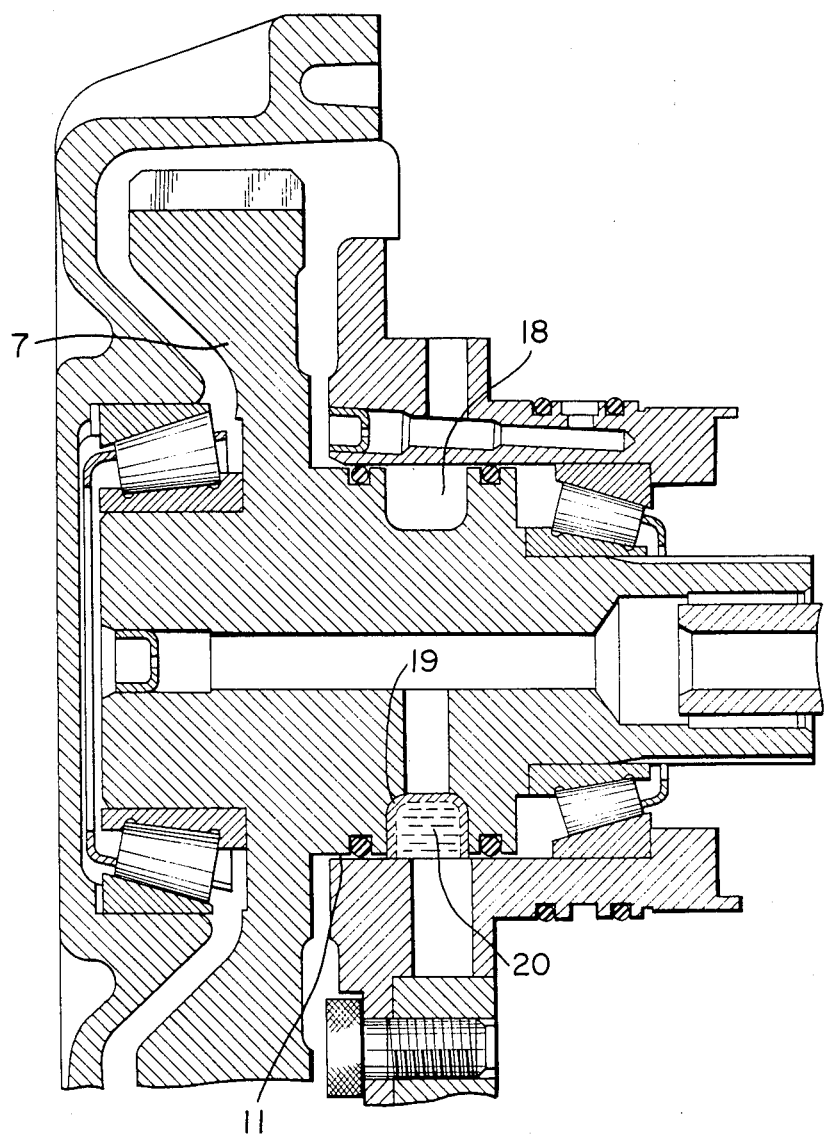
FIG. 3 is a sectional view similar to FIG. 2, for illustrating the effect of the present invention.

The depth and width of the annular groove 18 of the present invention are both large, and accordingly, the sectional area of the annular groove 18 is large. Therefore, the annular groove 18 stores a large amount of the oil, and most of the oil in the annular groove 18 does not rotate together with the output gear 7 even when the output gear 7 is rotating at high speeds, as shown in FIG. 3. In this case, only the oil in a hatched area 19 in FIG. 3 rotates together with the output gear 7 and the oil in an inner area 20 does not rotate. Therefore the centrifugal force has little influence on most of the oil in the annular groove 18, and the supply of the lubricating oil through the annular groove 18 can be always kept at a sufficient level even at high speeds of the output gear 7.

Figure 4:
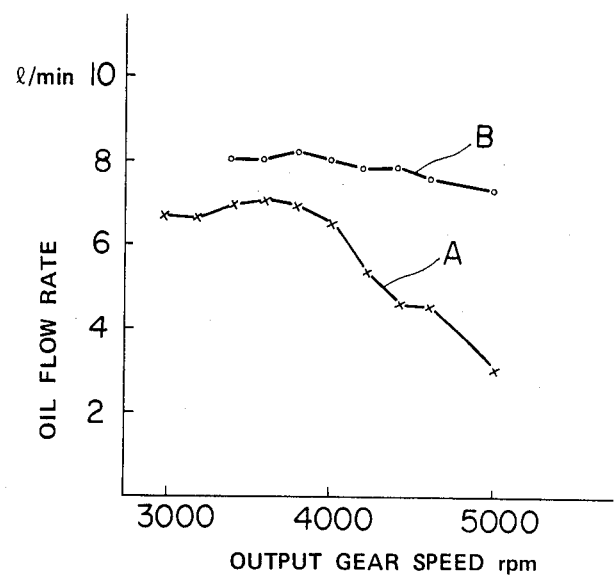
FIG. 4 is a diagram showing characteristics of the lubricating oil flow rate.

FIG. 4 shows characteristics of the lubricating oil flow rate through the annular groove, versus the rpm of the output gear 7 when the temperature of the lubricating oil is 120° C. A line A of FIG. 4 is a characteristic of a comparative example in which the annular groove is narrow and shallow, and the oil in the annular groove rotates together with the output gear. A line B is a characteristic according to the present invention. As evident from FIG. 5, the effect of the present invention is remarkable especially at high speeds.

What is claimed is:

1. An automatic transmission for a front engine, front wheel drive vehicle, comprising:
   a torque converter;
   a main power train comprising a rotatory terminal member, said main power train being connected with said torque converter for transmitting a driving torque from said torque converter to said terminal member;
   housing means enclosing said main power train, said housing means having a cylindrical bore and at least one oil feed passage opening in a clyindrical surface of said bore, and
   an output gear rotatably supported by said housing means and connected detachably with said terminal member of said main power train for transmitting the driving torque from said main power train to front wheels of the vehicle, said main power train being placed between said torque converter and said output gear, said output gear having a hub which is splined detachably to said terminal member, and which is fitting in said bore of said housing means in such a manner that said hub can rotate in said bore, said hub having an annular groove formed on an outer cylindrical surface of said hub, said output gear being formed with lubricating means extending from said annular groove for conveying oil from said annular groove, said oil feed passage of said housing means opening into said annular groove for supplying oil into said lubricating means through said annular groove, said annular groove having sufficient depth and width within a range permitted by a strength of said hub to prevent a shortage of the oil supply through said annular groove to said lubricating means due to a centrifugal force of the oil rotating in said annular groove together with walls of said annular groove.

2. An automatic transmission according to claim 1, wherein said hub has a cylindrical end portion having external splines formed on an outer cylindrical surface of said end portion, and said terminal member having internal splines formed on an inner cylindrical surface of a cylindrical bore formed in said terminal member, said end portion of said hub being fitted in said cylindrical bore of said terminal member.

3. An automatic transmission according to claim 2, wherein said housing means comprises a transmission housing, and a bearing retainer fixed to said transmission housing, said cylindrical bore of said housing means and said oil feed passage being formed in said bearing retainer.

4. An automatic transmission according to claim 3, further comprising two oil seal rings disposed on opposite sides of said annular groove between said hub and said cylindrical surface of said bore of said housing means.

5. An automatic transmission according to claim 1, wherein said output gear and said main power train are so connected that they can be disconnected by moving said output gear axially away from said main power train without disassembling said main power train.

6. An automatic transmission according to claim 1, wherein the width of said annular groove as measured in the axial direction of said hub is approximately 10 mm, and the depth of said annular groove as measured in the radial direction of said hub is approximately 10 mm.

7. An automatic transmission according to claim 6, wherein the outer diameter of said hub is approximately 53 mm, and the depth of said annular groove is approximately 9 mm, so that the diameter of the bottom of said annular groove is approximately 35 mm, and wherein the width of said annular groove is approximately 11 mm.

8. An automatic transmission according to claim 6, wherein said lubricating means of said output gear comprises a central axial passage extending axially in said output gear and three radial passages each extending radially inwardly from the bottom of said annular groove to said central axial passage.

9. An automatic transmission according to claim 1, wherein the depth of said annular groove is greater than approximately 9 mm.

10. An automatic transmission according to claim 9, wherein the width of said annular groove is greater than approximately 10 mm.

* * * * *